July 20, 1926.
C. C. GOODRICH
1,593,067
SPRING EQUALIZER
Filed July 28, 1924
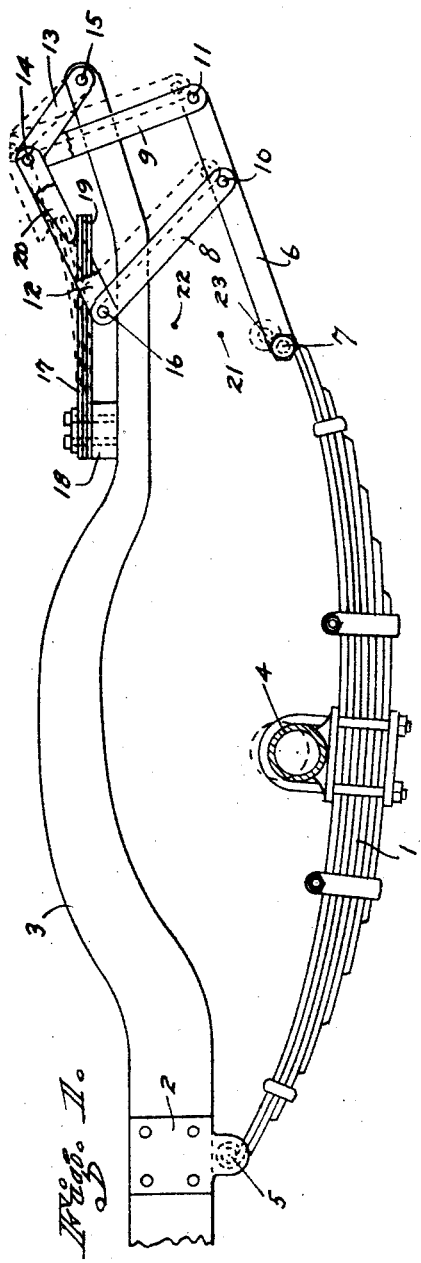
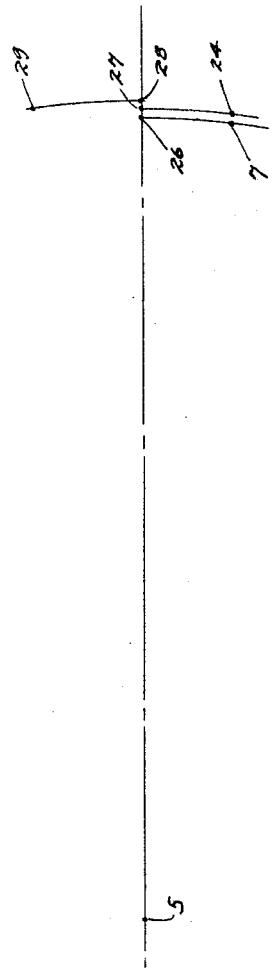
Inventor
Coy C. Goodrich
By
Attorneys Patented July 20, 1926.

1,593,067

UNITED STATES PATENT OFFICE.

COY C. GOODRICH, OF CHARLOTTE, MICHIGAN.

SPRING EQUALIZER.

Application filed July 28, 1924. Serial No. 728,756.

The following invention relates to improvements in spring suspension for motor vehicles and has particular reference to a spring equalizer such as is described in my copending application, Serial No. 707,214. In the latter application I described a means interposed between a vehicle spring and the frame thereof allowing contraction and expansion of the spring to effect a movement of the spring end towards and away from the frame. This means consists of a lever mechanism including two arms pivoted to the frame and one end and the fulcrum of a lever the other end of which is pivoted to a spring end and allows the lever mechanism to collapse as the spring expands and to open as the spring contracts, thereby allowing the spring end to play up and down as well as laterally. The extent of the collapse depends upon the shock received as well as upon the weight of the vehicle, and since the latter weight varies with the number of passengers on the vehicle it will be readily seen that if the lever mechanism is made to support a normal load of two passengers a load of five passengers would cause a collapse of the lever mechanism even before the vehicle is set in motion whereby the effective range of the spring action is lessened. The present invention contemplates an improvement adapted to remedy this situation by providing means in connection with the lever mechanism that will automatically adjust the lever mechanism to the load carried so as to normally cause the same clearance and the same range in vibratory movement to be maintained irrespective of the load carried by the vehicle. Further objects and advantages of my invention will appear as the specification proceeds.

The preferred form of my invention is illustrated in the accompanying drawing in which Figure 1 illustrates my lever mechanism as applied to the rear end of the motor vehicle frame, and Figure 2, a diagram, illustrates a certain principle to be considered in connection with the construction of my spring equalizer. While I have shown only the preferred form of the invention it should be understood that various changes or modifications may be made within the scope of the claims hereto attached without departing from the spirit of the invention.

The front end of my spring 1, which for the purpose of this illustration is shown as a semi-elliptical spring is pivoted as shown at 5 to a bracket 2 extending downwardly from the frame 3 and the central portion of the spring is secured to the rear axle housing 4. The rear end of the spring has one end of a lever 6 pivoted thereto as shown at 7, while two arms 8 and 9 are pivoted to the fulcrum 10, and the free end 11 of the lever and support in their free ends a link 12. The rear end of the latter link has a second link 13 pivoted thereto as shown at 14 and this link pivotally supports the rear end of the frame 3 as shown at 15. The front end 16 of the link 12 bears against the under face of a strong horizontal spring 17 secured to the block 18 formed integrally with the frame 3 so that the front end of link 12 supports the frame 3 through the spring 17. The latter spring extends beyond the front end of link 12 and bears with its rear end 19 against an arm 20 extending from the link 13 and formed integrally therewith.

The spring 17 is sufficiently strong to remain unaffected as long as the load of the vehicle does not exceed a predetermined weight, for instance, as long as the driver is the only occupant of the machine. The mechanism in this case works as follows: The spring 1 expands and contracts as the vehicle travels over the road surface. As the spring expands the lever 6 is pushed rearwardly and swinging backwardly on its two arms 8 and 9 causes its front end or the pivot 7 to rise so that an ordinary shock transmitted from the vehicle wheels to the axle and the springs might cause the pivot 7 to move to 21 and a heavy shock might cause it to move to 22. There being only one person in the machine the upward pressure exerted on the arm 8 by the spring action is not sufficiently strong to affect the spring 17 and the situation remains unchanged as far as the two points 14 and 16 and the position of the link 12 are concerned.

Assuming now that five passengers enter the car,—this naturally causes the spring 1 to expand and to set in motion the lever action. Upward pressure is brought to bear on the arm 8 and due to the increased weight of the machine the pressure is now sufficient to force the spring 17 upwardly into the dotted line position which motion is transmitted to the arm 20 of link 13 and causes the latter to swing on the pivot 15 so that the pivot 14 recedes into the dotted line position indicated in Figure 1, while the pivot 16 is caused to follow suit by the connecting link 12. In this manner the whole link mechanism has been shifted from the full line position into the dotted line position and a collapse of the mechanism has been prevented, the pivot 7 having merely been moved into the dotted line position as indicated at 23 instead of having moved to 21 and 22. Due to this construction, therefore, the original clearance between the spring end 7 and the frame, or the link 12, is substantially maintained and the range within which the end of the spring 7 can play has not been diminished to any appreciable extent.

In this connection attention is directed to the fact that the position of the pivot 5 at the front end of the spring relative to the pivot 7 at the rear end of the spring should be properly considered in producing best results. In the drawing the front end of the spring is shown as being in a higher horizontal plane than the rear end of the spring under normal load, so that until the pivot 7 reaches the horizontal plane of pivot 5 the horizontal distance of pivot 7 from pivot 5 will increase, not only due to expansion of the spring but also due to the revolving motion of the spring about the pivot 5. This is illustrated particularly well in Figure 2 from which it appears, that mere expansion of the spring would advance the point 7 to point 24 only, while mere revolving motion would advance point 7 to point 26. The combination of the two motions, however, advances point 7 to point 27. This results in a quicker collapse of the lever mechanism than would be called for by the mere expansion of the spring. If we consider that the purpose of my lever mechanism as described in the copending application is to distribute the effect of a shock transmitted from the wheels between the spring and the lever mechanism, causing the spring to take part of the shock by expanding and causing the lever mechanism to absorb another part by collapsing, and further considering that until pivot 7 reaches the horizontal plane of pivot 5 the collapse of the lever mechanism is quickened, it is clear that less movement of the spring center is called for to pass a certain obstacle since the lever mechanism absorbs more than its share during the initial period.

On the other hand after the pivot 7 passes the horizontal plane of pivot 5 the shortening of the horizontal distance of pivot 7 from pivot 5 counteracts the expansion of the spring with the result that thereafter the collapse of the lever mechanism is slowed down and the spring itself is forced to absorb a larger share of all shocks than it would if contraction and expansion of the spring were the only determining factor.

Referring to Figure 2 again, further expansion might advance the point 7 from 27 to 28, but the revolving movement from now on would counteract the advance in a horizontal plane due to expansion, and the result of the two components might be a point 29, that is a point showing hardly any advance in a horizontal plane.

Further attention may be called to the curve of the spring. The latter should preferably be arranged that when a shock of predetermined intensity is transmitted the spring will practically become straight so that shocks in excess thereof will have no further tendency to call into play the lever arrangement.

I claim:—

1. In combination with a vehicle spring, a lever having one end pivoted to one end of the spring, swinging arms spacing a supported element from the fulcrum and the other end of the lever respectively and means for suspending the vehicle frame from the said element.

2. In combination with a vehicle spring, a lever having one end pivoted to one end of the spring, swinging arms spacing a supported element from the fulcrum and the other end of the lever respectively and means for suspending the vehicle frame from the said element made to allow of a shifting of the supported element relative to the frame.

3. In combination with a vehicle spring, a lever having one end pivoted to one end of the spring swinging arms spacing a supported element from the fulcrum and the other end of the lever respectively and means for suspending the vehicle frame from the said element made to cause increased spring action to cause a shifting of the supported element relative to the frame.

4. In combination with a vehicle spring, a lever having one end pivoted to one end of the spring, swinging arms spacing a supported element from the fulcrum and the other end of the lever respectively and allowing the spring end to approach the supported element and to recede therefrom as the spring expands and contracts and means allowing the normal distance between the spring end and the supported element to be substantially maintained under different loads.

5. In combination with a vehicle spring, a lever having one end pivoted to one end of the spring swinging arms spacing a supported element from the fulcrum and the other end of the lever respectively and allowing the spring end to approach the supported element and to recede therefrom as the spring expands and contracts and means allowing the normal distance between the spring end and the supported element to be substantially maintained under different loads comprising means causing an increased load to shift the supported element relative to the lever whereby the same angularity of the swinging arms is maintained.

6. In combination with a vehicle spring, a lever having one end pivoted to one end of the spring, swinging arms spacing a supported element from the fulcrum and the other end of the lever respectively and allowing the spring end to approach the supported element and to recede therefrom as the spring expands and contracts, and a vehicle frame suspended from the supported element, the suspension means being made to cause a shifting of the supported element relative to the lever under varying loads for substantially maintaining the normal distance between the lever and the said element.

7. In combination with a vehicle spring, a lever having one end pivoted to one end of the spring, swinging arms spacing a supported element from the fulcrum and the other end of the lever respectively and allowing the spring end to approach the supported element and to recede therefrom as the spring expands and contracts, a vehicle frame having one end suspended from one end of the supported element and having yielding means bearing on the other end of the supported element adapted to yield under predetermined loads and means for causing the yielding means to shift the supported element relative to the lever when said predetermined load has been reached.

8. In combination with a vehicle spring, a lever having one end pivoted to one end of the spring, swinging arms spacing a supported element from the fulcrum and the other end of the lever respectively and allowing the spring end to approach the supported element and to recede therefrom as the spring expands and contracts, a vehicle frame, a link suspended from one end of the supported element having one end of the vehicle frame pivoted thereto, a spring associated with the frame bearing on the other end of the supported element and being made to yield under predetermined loads and an arm connected to the link bearing on the end of the spring for shifting the supported element when the predetermined load has been reached.

9. In combination with a vehicle spring, means interposed between the spring and a supported element allowing contraction and expansion of the spring to effect a movement of the spring end toward and away from the supported element respectively and having means associated therewith for substantially maintaining the normal distance between the spring end and the supported element under varying loads.

COY C. GOODRICH.